March 1, 1927.
M. CASTRICUM
MANUFACTURE OF WEFTLESS CORD FABRIC
Filed Aug. 16, 1923
2 Sheets-Sheet 1

INVENTOR.
Martin Castricum
BY
Edward E. Taylor
ATTORNEY.

March 1, 1927.                                                                       1,619,191
M. CASTRICUM
MANUFACTURE OF WEFTLESS CORD FABRIC
Filed Aug. 16, 1923                    2 Sheets-Sheet 2
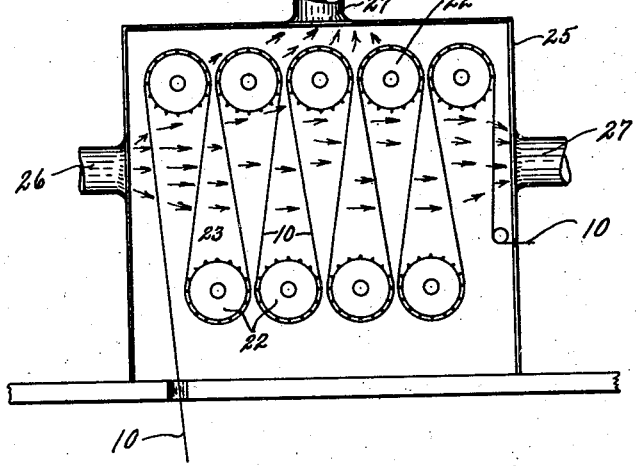
Fig. 2.
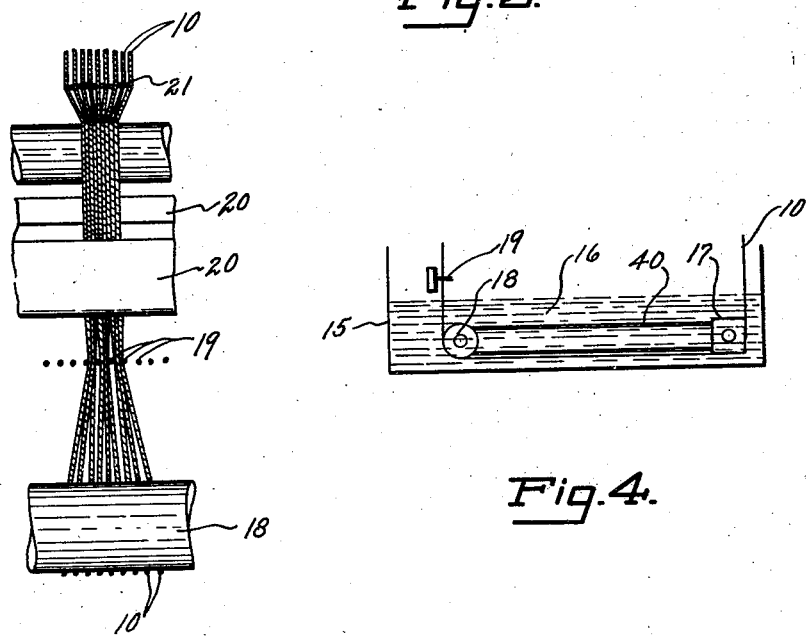
Fig. 4.
Fig. 3.
INVENTOR.
Martin Castricum
BY
Edward C. Taylor
ATTORNEY.

Patented Mar. 1, 1927.

1,619,191

UNITED STATES PATENT OFFICE.

MARTIN CASTRICUM, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

MANUFACTURE OF WEFTLESS CORD FABRIC.

Application filed August 16, 1923. Serial No. 657,791.

My present invention relates to the manufacture of weftless cord fabric in which a cord penetrating material is first applied to the cords, and in which the final rubber matrix is applied preferably by calendering. It has for its object the manufacture of "fabric" of this type in which the calendered rubber may enter between the cords and bind and rivet the assembly firmly together, and in which an improved bond between the cords and rubber is obtained.

Briefly stated, the invention includes arranging the cords in spaced parallel relation out of contact with each other, impregnating them with a penetrating and binding liquid such as any of the known solutions or emulsions of rubber, bringing the cords into substantial contact with each other and removing excess liquid, again separating the cords for drying them, and finally arranging the cords in the spacing desired for the fabric to be made and applying the rubber matrix. By this course of procedure it is possible to prepare a fabric having full advantages of both the solution and calender processes, a result never before attained. In former processes the cement or latex was left as a bridge or web between the cords, preventing the riveting of the later-applied opposed rubber layers to each other. If it were attempted to use a less number of cords per inch the cords would receive uneven deposits from the liquid, and difficulty was experienced due to "webbing" at some places and not at others. This also resulted in a disadvantageous uneven vulcanization due to the fact that the latex rubber generally received its sulfur by migration from the surrounding calendered rubber. Uneven thicknesses of latex rubber would therefore obtain uneven amounts of sulfur with resulting fluctuations in the strength of the vulcanized product. According to the present process the cords are treated with only enough liquid to insure their adhesion to the later-applied rubber, and the disadvantages inherent in the former processes are avoided.

The invention will now be described with particular reference to the accompanying drawings, in which—

Fig. 2 is a diagrammatic detail of a modification;

Fig. 3 is a detail on line 3—3 of Fig. 1; and

Fig. 4 is a detail of a modification.

Figure 1:
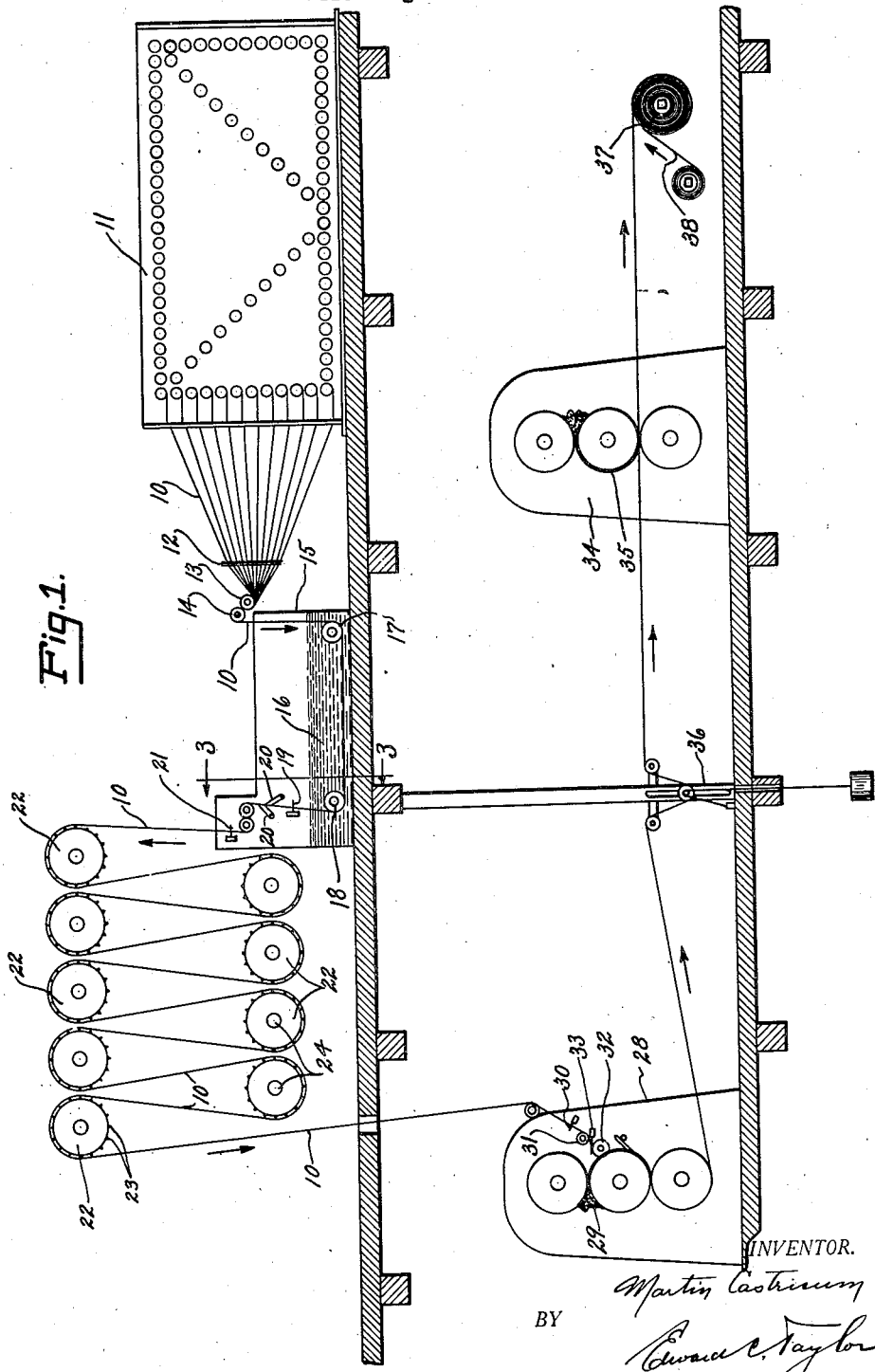
Fig. 1 is a diagrammatic side elevation of an apparatus for practicing the invention.

The cords 10 are led from a creel shown conventionally at 11 and made according to any form of standard practice. From the creel they pass through a thread board 12 and between rollers 13 and 14, whereby they are arranged in sheet formation. The holes in the thread board are so arranged that adjacent cords will be slightly separated from each other when they leave the roll 14. The cords pass then into a tank 15 partially filled with the impregnating and binding liquid 16, being held under the liquid by passing around rollers 17 and 18 suitably journaled within the tank. The spaced condition of the cords as they pass through the liquid (see the bottom of Fig. 3) permits this to contact with the entire surface of each cord as thoroughly as if each cord were being coated individually. As the cords rise from the bath they pass through a comb 19, the teeth of which are so arranged as to crowd the cords towards each other. A convenient way of attaining this end is to place a plurality of cords (three as shown) between adjacent teeth of the comb. With the cords in this arrangement they meet doctor blades 20, which scrape off all excess liquid from them. If the cords were not crowded together at this point the doctor blades would simply force the liquid between the cords, whereas under the process shown the surplus liquid is entirely removed. A comb 21 again separates the cords, preferably sufficiently widely to permit of air circulation between them, and the cords are then ready for drying.

The portion of the apparatus of Fig. 1 devoted to drying is composed of a plurality of rolls 22 arranged in two tiers, the cords passing alternately over rolls of the two sets in the zigzag path illustrated. To prevent rubber from the liquid accumulating on the rolls and causing the rubber deposited on the cords to be stripped from them by adhesion to this accumulation the rolls 22 are provided with preferably wedge-shaped ribs 23 on which the cords ride. Drying may be accomplished in any desired way. For example, the cylinders may be heated by steam introduced through pipes 24. Or the surface of the cylinders may be perforated and heated air introduced through the cords which blows between the cords on and between the rolls. Or the method indicated in Fig. 2 may be employed, in which the cylinders are enclosed in a casing 25 provided with an inlet 26 and outlets 27. Heated air introduced through inlet 26 will dry the cords during their passage through the chamber.

The heated and dried cords pass directly from the drying apparatus to a calender 28 in which a sheet of rubber is formed from a feed 29 in the usual way. Adjacent one roll of the calender is a suitable cord guiding apparatus, which serves to place the cords on the calendered rubber in parallel relation with the spacing desired in the product. This guiding apparatus is preferably of the type shown and claimed in my co-pending application Serial No. 649,413, filed July 5, 1923, and comprises a comb 30, conveniently arranged with three cords to a dent, a drag bar or roller 31, and a roller 32 upon the surface of which the cords are positioned by a comb 33, preferably arranged with one cord to a dent. Other suitable guiding devices may be substituted without departing from the invention. The action of this calender is to press against one side of the assembled sheet of cords a sheet of rubber, the rubber forming a smooth surface between the cords and passing partially between them.

It is generally preferable to cover the other side of the assembled sheet with a second web of rubber. For this purpose a second calender 34 is provided, acting to apply a sheet of rubber 35 to the side of the cords left uncoated by calender 28. A tension and equalizing device 36 is preferably placed intermediate the calenders, as is well understood, to keep the cord web taut and to accommodate irregularities in the speeds of the two calenders. The completed web is wound up at 37 with a liner 38.

The finished product comprises a series of spaced cords, each impregnated with the binding material and completely surrounded by the calendered rubber, the two sheets of which are integrally united in the spaces between the cords. The binding material bonds the cords to the calendered rubber, and adds to the strength of the product resulting from the riveting of the two calendered sheets in the spaces between the cords. By this method not only can these increases in homogeneity of the product be attained, but the liquid treatment of cords is made applicable to cases where it is desired to reduce the number of cords per inch in order to conserve cost.

In Fig. 4 I have shown a modification adapted for insuring the thorough penetration of the binding liquid between the cords. In this modification roll 17 is made angular, so that as it revolves the cords will be given a slight up and down movement in the liquid. If necessary to prevent slip of the cords over this roll, it may be positively driven by a chain 40 from roll 18 or some other portion of the machine such as roll 14. This construction causes the cords to be swashed up and down in the liquid sufficiently to force the latter positively between the cords.

Having thus described my invention, I claim:

1. A process of producing weftless cord fabric which comprises arranging cords in spaced relation to form a sheet, applying a liquid to the cords, crowding the cords together laterally of the sheet and removing excess liquid, separating the cords and drying, and uniting the cords into web form.

2. A process of producing weftless cord fabric which comprises arranging cords in spaced relation to form a sheet, applying a liquid to the cords, crowding the cords together laterally of the sheet and removing excess liquid, separating the cords and drying, again locating in spaced relation the cords forming the sheet, and pressing sheets of rubber upon opposite sides of the sheet of cords so as to penetrate and unite between the cords.

3. An apparatus for forming weftless cord fabric which comprises a cord supply, means to arrange the cords in separate spaced relation to form a sheet, devices for guiding the cords through a liquid bath while thus separated, means to crowd the cords together while still preserving the sheet form, devices acting while the cords are thus crowded to remove excess liquid from the cords, and devices for applying to the cords a uniting matrix of rubber.

4. An apparatus for forming weftless cord fabric comprising devices for arranging the cords in spaced parallel relation to form a sheet, means for treating the cords with a liquid while so arranged, devices for crowding together the cords forming the sheet and removing excess liquid therefrom, devices for again separating the cords forming the sheet and drying them, devices for arranging the cords forming the sheet in the spacing desired for the final web, and means for applying opposed rubber sheets to the spaced cords so as to form a matrix enclosing the individual cords.

5. An apparatus for forming a weftless cord fabric comprising devices for treating individually with a liquid a series of cords arranged in sheet form; devices for removing excess liquid therefrom; and drying devices adapted to permit the penetration of the drying medium between the cords including devices for spacing from each other the cords forming the sheet, and a series of ribbed cylinders over which the cords pass, said ribs being so arranged as to prevent substantial stripping from the cords of the material deposited thereon by the liquid.

MARTIN CASTRICUM.